Patented Apr. 4, 1950

2,502,686

UNITED STATES PATENT OFFICE 2,502,686

2,3-BUTANEDIYL PHTHALATE RESINS

Ralph Wade Watson, Ottawa, Ontario, Canada, assignor to The Honorary Advisory Council for Scientific and Industrial Research, Ottawa, Ontario, Canada, a corporation of Canada No Drawing. Application December 28, 1946, Serial No. 719,132

2 Claims. (Cl. 260—75)

This invention relates to synthetic resins, and more particularly to amorphous poly 2.3-butanediyl phthalate resins which are produced by the reaction of a butanediol with phthalic anhydride.

In United States of America Patent 1,890,668 there is disclosed the production of polyhydric alcohol-polybasic acid resins, which are soft and have high acid numbers, by, for example, reacting 2-3 butylene glycol with phthalic anhydride at a maximum temperature of 290° C. in a partially closed vessel.

The object of the present invention is to produce resins which are relatively hard, which have a high flow point, which have low viscosities in solutions, which are soluble in a wide range of commercial solvents, which are highly resistant to water and which have a low acid number. These improved characteristics well adapt the resins for commercial use, as nonconvertible binders in paints and varnishes, as vapour barriers, for film forming purposes and like purposes well known to those skilled in the art.

These and other objects are attained by reacting at least one of the laevo-, laevo-dextro-, meso-, meso-dextro-2,3-butanediols with phthalic anhydride at a temperature not substantially exceeding 220° C., although temperatures up to 250° C. may be used but with lower yield. The preferred temperature range is generally from 200 to 220° C. as this gives maximum yield of resin, with minimum breakdown, and in the shortest reaction period. While lower temperatures may be used, those below 180° C. lead to impractically long reaction times. Temperatures much above 220° C., even in an inert atmosphere, lead to breakdown or decomposition of the resin and reduced yields. Heating the formed resin under an inert gas at temperatures above 220° C. gives a product of higher acid number.

A large excess of the diol is used to speed up the reaction. Although hard resins may be made with as little as 5 or 10% molar excess of diol the time required to make the reaction substantially complete is greatly prolonged. Even 75% requires an undesirably long time. An excess of 125% may be used but there appears to be no advantage in doing so. A range of excess diol from about 90 to 110% is preferred. Applicant has found 100% in excess of the theoretical amount of the diol to give optimum results. The reaction may be carried out, much more slowly however, under solvents such as toluene, benzene or xylene and the water formed removed by distillation.

The reaction is carried out in an inert atmosphere, which may be provided by oxygen-free nitrogen, carbon dioxide, hydrogen or the like, which are bubbled through the reacting mixture. To reduce the partial pressure of volatile components after esterification has progressed to about 90% the rate of bubbling of inert gas may be increased ten fold or more in order to increase polymerization and to remove water and excess diol.

When the reaction has progressed for a desired time, a vacuum, of 1–10 preferably 1–5 mm. of mercury, is applied and maintained for a period depending on the precise properties desired in the resin to be produced. This serves two purposes. It rapidly removes the excess diol from the resin, and maintenance of the vacuum for a further period serves to substantially complete the removal of diol and at the same time to promptly remove water formed in the reaction and thus speed up polymerization.

Beginning at a temperature of approximately 150° C. of the reaction mixture and bubbling and sweeping the mixture with an inert gas for 10 to 20 minutes, the temperature is raised rapidly to about 200° C. and then slowly to 215° C. After about 5 hours a fractionating column used to separate diol and ketal—which have been returned to the reaction vessel—is replaced by a condenser especially designed to avoid stoppage by sublimed phthalic anhydride and to provide for condensing of diol vapor during the early part of the next stage of the reaction which is carried out under reduced pressure.

For purposes of illustration and not in limitation the following examples of operation of the invention are given. The reaction vessel may be of glass, stainless steel or the like and is equipped with an inert gas inlet, a temperature measuring device, a stirrer and a fractionating column for the escape of byproducts—water and ketone—but not the reactants.

(1) 196.8 parts by weight of 1-2,3-butanediol were reacted with 185 parts by weight of o-phthalic anhydride at a temperature of 200° C. in a nitrogen atmosphere and at atmospheric pressure. This is a 75% molar excess of the diol. At the end of 10 hours the esterification was 96.2% complete and the product had an acid value of 10.6. A vacuum was applied and maintained for 4 hours with the temperature increased to 220° C. The final cooled reaction product had a flow point of 112° C., an acid value of 3.4 and a Brinell hardness of 17 (2 mm. ball—5 kg. load).

(2) 148.9 parts of o-phthalic anhydride and 180 parts of 1-2,3-butanediol (99.3% molar excess) were reacted together at 200 to 215° C. under deoxygenated nitrogen and atmospheric pressure for 5 hours. The degree of esterification reached 97.8% and the reaction mixture had an acid value of 5.4.

(3) 202.5 parts of 1-2,3-butanediol and 148 parts of o-phthalic anhydride were heated at 200° C. for 6 hours under nitrogen and atmospheric pressure. The molar excess of diol is 125%. At this stage the esterification was 95.6% and the reaction product had an acid value of 10.4. Heating for 10 hours under vacuum the final resin had an acid value of 1.7, a flow point of 120° C. and a Brinell hardness of 19 (2 mm. ball—5 kg. load).

(4) 4.5 moles of o-phthalic anhydride and 9 moles 1-2.3-butanediol (100% molar excess) were reacted for 5 hours at 200-215° C. under nitrogen and atmospheric pressure. A vacuum was applied at 215-220° C. for 10 hours. The reaction product had an acid value of 1.4, a flow point of 134° C. and a Brinell hardness of 20 (2 mm. ball and 5 kg. load). The viscosity of an 80% solution of this resin in acetone, benzene and toluene was respectively 8.5, 30 and 33 centipoises.

(5) 1 mole o-phthalic anhydride and 2 moles of meso-dextro-2.3-butanediol (100% molar excess) were reacted together at 205° C. for 5 hours under deoxygenated nitrogen and atmospheric pressure. The reaction was continued for another 5 hours under vacuum at 210-250° C. The product had an acid value of 6.3, and a flow point of 150° C. and a Brinell hardness of 24 (2 mm. ball and 3.5 kg. load).

Resins so produced are soluble in benzene, toluene, acetone, xylene, alkyl acetates, methylethylketone and cyclohexanone, some chlorinated solvents like chloroform and methylene chloride, acetic acid, partially soluble in alcohols, diethyl ether and carbon disulphide, and insoluble in water, saturated aliphatic hydrocarbons, carbon tetrachloride, coal oil and turpentine.

Solutions of the resins have a low viscosity. For example, a resin having a flow point of 134° C. provides in a solution of 10 to 80% of the resin in acetone a viscosity of 0.5 to 8.5 centipoises, measured at 25° C. The variation may be indicated as follows—10% solution 0.5 centipoises, 50% solution 3.0, 80% solution 8.5. In benzene solutions of the same concentrations the viscosity varies from 1 to 30 centipoises and in toluene from 1 to 33 centipoises.

The acid value of the resins may vary from 1 to 10, the flow point from 80-160° C., the Brinell hardness from about 10 to 30, and the saponification values from 350 to 375. For comparison ethylene phthalate has a flow point of 69-80° C. The specific gravity varies from about 1.2 to 1.3 and the specific volume in cubic inches per pound is about 22. Their molecular weight as determined by isothermal distillation is found to be lower than 3000 and as low as 1000.

The time and temperature of heating the reaction mixture has a definite effect on the hardness; the longer the time of heating at temperatures below 220° C. in an inert atmosphere the harder the resin. For comparison it may be said that ethylene phthalate having equivalent molecular weight has a Brinell hardness of less than 5.

The solidified reaction product when immersed in water may show a small amount of absorption, probably due to the presence of diol. One sample block, 11 mm. thick, at the end of 24 hours immersion in water at 25° C. absorbed 0.035% of water. For comparison a block of glyceryl phthalate ⅛" thick immersed in water at 25° C. for 24 hours absorbed 0.2 to 0.6% water. By boiling the product of this invention with water and then drying it the resin is purified and the water absorption becomes virtually zero. Submersion of a pure neutral resin, of a molecular weight of 3000, Brinell hardness 28 and flow point 160 showed at the end of 8 weeks no trace of water absorption. Its colour, lustre, transparency and entire appearance remain unchanged.

The resin of itself is not combustible and burns only when placed in a continuous extraneous flame. It is transparent and darkening effects due to exposure to summer sunlight for five months are very slight.

Resin produced by the method described is a pale straw-coloured solid at ordinary temperatures. It may be completely and rapidly decolourized by passing oxygen or air containing 2-3 mole per cent of ozone through an efficient bubbler into a concentrated solution of the resin in a solvent (acetone methyl acetate, etc.) held at a low temperature, e. g., −30 to 0° C. Dissolved oxygen or ozone may be removed by bubbling or sweeping with an inert gas, after which the solvent is recovered. The degree of polymerization is not significantly lowered by this treatment.

The decomposition of the resin in air at a temperature of 180° C. is slow and also slow at a temperature of 220° C. in an inert atmosphere.

Phthalic acid may be used but it requires longer reaction periods. Phthalic anhydride is preferred.

The flow points were measured by the D'Alelio Industrial Method (p. 119, part B, Laboratory Manual of Plastics and Synthetic Resins, John Wiley & Sons Inc., 1943).

What is claimed is:

1. A method of producing hard transparent amorphous resins which comprises reacting 2-3 butanediol with phthalic anhydride under atmospheric pressure in an inert atmosphere with 90–110% molar excess of 2-3 butanediol at a temperature not less than 200° C. and not exceeding 250° C. to eliminate water of reaction and excess butanediol to obtain, on cooling, a hard resin having a molecular weight between 1000 and 3000.

2. A method of producing hard transparent amorphous resins which comprises reacting 2-3 butanediol with phthalic anhydride under atmospheric pressure in an inert atmosphere with 90–110% molar excess of 2-3 butanediol at a temperature not less than 200° C. and not exceeding 220° C. to eliminate water of reaction and excess 2-3 butanediol and thereafter reducing the pressure upon the reacting mass to 10-1 mm. of mercury and continuing to heat the mass at a temperature not less than 210° C. and not over 250° C. to eliminate residual 2-3 butanediol and water to obtain, on cooling, a resin having a molecular weight between 1000 and 3000.

RALPH WADE WATSON.

REFERENCES CITED

The following references are of record in the file of this patent:

UNITED STATES PATENTS

| Number | Name | Date |
|---|---|---|
| 1,864,909 | Jaeger | June 28, 1932 |
| 1,890,668 | Bradley | Dec. 13, 1932 |
| 2,012,267 | Carothers | Aug. 27, 1935 |
| 2,251,298 | Soday | Aug. 5, 1941 |
| 2,410,073 | Howard | Oct. 29, 1943 |
| 2,448,584 | Frosch | Sept. 7, 1948 |

FOREIGN PATENTS

| Number | Country | Date |
|---|---|---|
| 296,787 | Great Britain | Feb. 7, 1930 |

OTHER REFERENCES

Ellis, Chemistry of Synthetic Resins, vol. 2, pages 876 and 896, Reinhold Publishing Corp., New York (1935).

Carothers, Collected Papers, pages 26–28 (1940), Interscience Publishing Co.